Patented Feb. 20, 1951

2,542,223

UNITED STATES PATENT OFFICE 2,542,223

6-KETO-$\Delta^{5,9}$-10-METHYLDECALONE-1

Norman L. Wendler, Linden, and Harry L. Slates, Cranford, N. J., assignors to Merck & Co., Inc., Rahway, N. J., a corporation of New Jersey No Drawing. Application March 1, 1950, Serial No. 147,158

4 Claims. (Cl. 260—586)

This invention is concerned generally with octahydronaphthalene compounds and with processes for preparing them. More particularly, it relates to the novel compound 6-keto-$\Delta^{5,9}$-10-methyldecalone-1, and with the process of preparing this compound by condensing 2-methyldihydroresorcinol with methyl vinyl ketone, followed by cyclization of the condensation product thus obtained. 6-keto-$\Delta^{5,9}$-10-methyldecalone-1 possesses the AB ring system characteristic of certain members of the steroid group of compounds (such as testosterone, progesterone, and adrenal hormones such as cortisone) and also possesses the proper functional substitution in ring A together with angular methylation at position 10. 6-keto-$\Delta^{5,9}$-10-methyldecalone-1 is capable of further elaboration to a steroid member and is of value as a starting material for the total synthesis of steroid hormones.

The 6-keto-$\Delta^{5,9}$-10-methyldecalone-1, subject of the present invention, can be prepared by reactions which may be chemically represented as follows:

In carrying out the foregoing reactions, the 2-methyldihydroresorcinol is ordinarily dissolved in an aliphatic alcohol, preferably a lower aliphatic alcohol such as methanol, ethanol, propanol, and the like. A mixture of this solution and an aqueous solution of methyl vinyl ketone is reacted, at room temperature, in the presence of a catalytic amount of a tertiary amine. Suitable tertiary amines are trialkyl amines, such as triethyl amine, dialkyl aryl amines, such as dimethyl aniline and tertiary heterocyclic amines, such as pyridine, and the like. The reaction mixture is shaken periodically and allowed to stand for a period of 16–20 hours after which time it is filtered and evaporated in vacuo. The residual light-colored oil is dissolved in a water-immiscible organic solvent such as ether and the solution is extracted with an aqueous sodium bicarbonate solution to remove acidic products. The organic solvent layer is dried and, upon evaporation of the ether, yields the desired 2-methyl-2-(butanone-3-yl)-1,3-diketo cyclohexane (compound 3), which is obtained as an oil.

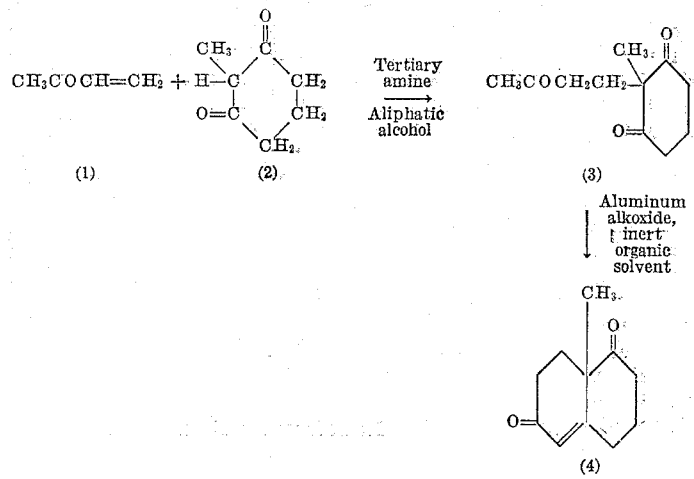

The reactions, indicated above, are conducted as follows: Methyl vinyl ketone (compound 1) is condensed with 2-methyldihydroresorcinol (compound 2), in solution in an aliphatic alcohol and in the presence of a catalytic amount of a tertiary amine, to produce 2-methyl-2-(butanone-3-yl)-1,3-diketo-cyclohexane (compound 3); this compound is then heated in solution in an inert organic solvent in the presence of an aluminum alkoxide to produce 6-keto $\Delta^{5,9}$-10-methyldecalone-1 (compound 4).

The 2-methyl-2-(butanone-3-yl)-1,3-diketo-cyclohexane is dissolved in an inert organic solvent, such as benzene, toluene, xylene, dioxane, ether, and the like, and the solution is heated under reflux, preferably in a nitrogen atmosphere, in the presence of a mild neutral catalyst, such as an aluminum alkoxide. Suitable aluminum alkoxides are aluminum tertiary butylate, aluminum ethylate, aluminum phenate, and the like. The reaction mixture is acidified, extracted with a water-immiscible organic solvent such as ether, and the ether extract evaporated to produce crude 6-keto-$\Delta^{5,9}$-10-methyldecalone-1 (compound 4) which is obtained as a thick oil.

This compound can be purified, if desired, by chromatographic adsorption on an alumina column followed by elution of the adsorbate with mixtures of benzene and ether. The product obtained, after evaporation of the eluate, is recrystallized to produce substantially pure crystalline 6-keto-$\Delta^{5,9}$-10-methyldecalone-1.

The following examples illustrate methods of carrying out the present invention, but it is to be understood that these examples are given for purposes of illustration and not of limitation.

Example 1

A solution of 10 g. of 2-methyldihydroresorcinol in 155 cc. of methanol was treated with 13.8 cc. of an 85% aqueous solution of methyl-vinyl ketone (stabilized with hydroquinone) and 1.5 cc. of triethylamine. The reaction mixture was shaken periodically and allowed to stand at room temperature for 16–20 hours. The solution was filtered from traces of polymeric materials and the clear filtrate was vacuum evaporated to a light colored oil. The latter was dissolved in ether and thoroughly extracted with 5% aqueous sodium bicarbonate solution. The ether solution was subsequently dried over anhydrous sodium sulfate, the solvent evaporated and the residue distilled in vacuo to produce 6 g. of 2-methyl-2-(butanone-3-yl)-1,3-diketo cyclohexane; B. P. 95–100°/0.01 mm., $\lambda_{Max}$:$C_2H_5OH$: 2820 Å, $E_{1\,cm.}^{1\%}$ 4.3 (carbonyl absorption).

Example 2

A solution of 6.3 g. of 2-methyldihydroresorcinol in approximately 100 cc. of methanol was treated with 10 cc. of an 85% aqueous solution of methyl-vinyl ketone (stabilized with hydroquinone) and 10 drops of triethylamine. The reaction mixture was shaken periodically and allowed to stand at room temperature for 16–20 hours. The solution was filtered from traces of polymeric materials and the clear filtrate was vacuum evaporated to a light colored oil. This product was distilled in vacuo to produce 6.3 g. of 2-methyl-2-(butanone-3-yl)-1,3 - diketocyclohexane.

Example 3

4 g. of 2-methyl-2-(butanone-3-yl)-1,3-diketo-cyclohexane, prepared as described in Example 1, was dissolved in 50 cc. of benzene and the solution was treated with 4 g. of aluminum t-butylate and refluxed in a nitrogen atmosphere for 20 hours. After cooling, the product was acidified and extracted thoroughly with ether, the ether solution dried over anhydrous sodium sulfate and concentrated under redeced pressure to a thick oil, wt., 3.75 g.

$\lambda_{Max}$: $C_2H_5OH$: 2450 Å. $E_{1\,cm.}^{1\%}$ 279

Yield, 40%

40% ($E_{1\,cm.}^{1\%}$: 673 for pure material). This product was chromatographed on 200 g. of acid washed alumina, elution being effected with mixtures of benzene and ether. From the chromatographic purification there were obtained crystalline fractions from eluates corresponding to 5% ether-benzene to 20% ether-benzene. These crystalline fractions were recrystallized from 50% ether-petroleum ether to afford 6 - keto - $\Delta^{5,9}$ - 10 - methyldecalone - 1 as small, colorless prisms, M. P. 49–50°, $\lambda_{Max}$: $C_2H_5OH$: 2430, $E_{1\,cm.}^{1\%}$ 673

Analysis.—Calc'd for $C_{11}H_{14}O_2$: C, 74.16; H, 7.86; C-methyl, 1.00. Found: C, 74.35; H, 7.73; C-methyl, 0.97.

Various changes and modifications may be made in carrying out the present invention without departing from the spirit and scope thereof. Insofar as these changes and modifications are within the purview of the annexed claims, they are to be considered as a part of our invention.

We claim:

1. 6-keto-$\Delta^{5,9}$-10-methyldecalone-1 having the structural formula:

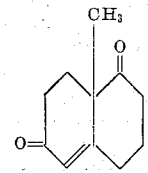

2. The process of preparing 6-keto-$\Delta^{5,9}$-10-methyldecalone-1 which comprises reacting methyl-vinyl ketone with 2-methyldihydroresorcinol in the presence of a tertiary amine to form 2-methyl - 2 - (butanone - 3 - yl) -1,3-diketo-cyclohexane, and heating this compound in solution in an organic solvent in the presence of an aluminum alkoxide to produce 6-keto-$\Delta^{5,9}$-10-methyldecalone-1.

3. The process which comprises reacting methyl-vinyl ketone with 2-methyldihydroresorcinol in the presence of a tertiary amine, followed by cyclization of the compound thus produced by heating said compound in an organic solvent in the presence of an aluminum alkoxide.

4. The process of preparing 6-keto-$\Delta^{5,9}$-10-methyldecalone-1 which comprises reacting methyl-vinyl ketone with 2-methyldihydroresorcinol in the presence of triethylamine to form 2-methyl-2-(butanone-3-yl) - 1,3 - diketo-cyclohexane, and heating this compound in solution in benzene in the presence of aluminum t-butylate to produce 6-keto-$\Delta^{5,9}$-10-methyldecalone-1.

NORMAN L. WENDLER.
HARRY L. SLATES.

No references cited.